United States Patent
Weinfurther et al.

(10) Patent No.: US 9,868,418 B2
(45) Date of Patent: Jan. 16, 2018

(54) VEHICLE NETWORK COMMUNICATION PROTECTION

(71) Applicant: Ford Global Technologies, LLC, Dearborn, MI (US)

(72) Inventors: James M. Weinfurther, Farmington, MI (US); Eric Ramsay Paton, Sylvan Lake, MI (US); Aldi Caushi, Northville, MI (US); Lisa T. Boran, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 23 days.

(21) Appl. No.: 15/152,722

(22) Filed: May 12, 2016

(65) Prior Publication Data

US 2017/0327080 A1    Nov. 16, 2017

(51) Int. Cl.
*B60R 25/10*    (2013.01)
*G08B 13/22*    (2006.01)

(52) U.S. Cl.
CPC .......... *B60R 25/1001* (2013.01); *G08B 13/22* (2013.01)

(58) Field of Classification Search
CPC ........................... B60R 25/1001; G08B 13/22
See application file for complete search history.

(56) References Cited

U.S. PATENT DOCUMENTS 3,932,738 A * 1/1976 Hauber .............. G05B 19/4063
340/146.2
5,515,285 A * 5/1996 Garrett, Sr. ........... B60R 25/102
340/426.2
5,543,776 A * 8/1996 L'Esperance ....... B60R 25/1003
180/287
7,331,060 B1 * 2/2008 Ricciulli ............. H04L 63/1458
709/227
9,180,783 B1 * 11/2015 Penilla ................ B60L 11/1824
9,649,895 B2 * 5/2017 McCormick ........ B60C 23/0408
(Continued)

FOREIGN PATENT DOCUMENTS

DE    102013001412 A1    7/2014
DE    202014104646 U1    12/2014
(Continued)

OTHER PUBLICATIONS

Intellectual Property Office, search report for the corresponding GB Patent Application No. GB1707041.8, dated Oct. 13, 2017.

*Primary Examiner* — Brian Zimmerman
*Assistant Examiner* — Willard Edwards, Jr.
(74) *Attorney, Agent, or Firm* — Frank MacKenzie; Brooks Kushman P.C.

(57) ABSTRACT

A vehicle includes a gateway controller configured to interface a diagnostic port to a vehicle communication network. In response to a perimeter alarm system being in an armed state, transfer of messages from the diagnostic port to the vehicle communication network is inhibited. A change session diagnostic request received from the diagnostic port is transferred to the vehicle communication network in response to vehicle speed being less than a threshold and an ignition switch begin in a run position. The transfer of the change session diagnostic request is otherwise inhibited unless intended for a module designated for reprogramming keys.

18 Claims, 2 Drawing Sheets

(56) References Cited

U.S. PATENT DOCUMENTS

| | | | | |
|---|---|---|---|---|
| 9,688,248 | B2 * | 6/2017 | Chambers | B60R 25/00 |
| 2001/0056579 | A1 * | 12/2001 | Kogane | G08B 13/19634 |
| | | | | 725/105 |
| 2005/0128064 | A1 * | 6/2005 | Riesebosch | G08B 21/24 |
| | | | | 340/457 |
| 2010/0277296 | A1 * | 11/2010 | DeMille | B60R 25/10 |
| | | | | 340/426.1 |
| 2011/0063982 | A1 * | 3/2011 | Elder | H04L 12/66 |
| | | | | 370/241 |
| 2012/0169487 | A1 * | 7/2012 | Poder | B60R 25/102 |
| | | | | 340/426.15 |
| 2013/0120132 | A1 * | 5/2013 | Hicks, III | H04W 4/22 |
| | | | | 340/501 |
| 2013/0121239 | A1 * | 5/2013 | Hicks, III | H04W 4/12 |
| | | | | 370/328 |
| 2014/0133392 | A1 | 5/2014 | Das et al. | |
| 2015/0120331 | A1 * | 4/2015 | Russo | G06Q 40/08 |
| | | | | 705/4 |
| 2015/0124807 | A1 * | 5/2015 | Martin | H04L 12/2838 |
| | | | | 370/390 |
| 2016/0012653 | A1 | 1/2016 | Soroko | |

FOREIGN PATENT DOCUMENTS

| | | | |
|---|---|---|---|
| EP | 1975897 | A2 | 10/2008 |
| GB | 2525462 | A | 10/2015 |
| WO | 2012090229 | A2 | 7/2012 |
| WO | 14181094 | A1 | 11/2014 |

\* cited by examiner

VEHICLE NETWORK COMMUNICATION PROTECTION

TECHNICAL FIELD

This application generally relates to controlling access to vehicle network communication channels through a diagnostic port.

BACKGROUND

A diagnostic port, which is also referred to as a data link connector (DLC) or an on-board diagnostic (OBD) port, provides an interface whereby entities, such as technicians, mechanics and customers can access information on a vehicle network. Traditionally, the OBD port allows unrestricted access to multiple vehicle buses of the vehicle network, which allows diagnostic tools to configure Electronic Control Units (ECUs) and access data.

SUMMARY

A vehicle includes a diagnostic port. The vehicle also includes a gateway controller, electrically connected to the diagnostic port and a vehicle network, configured to interface the diagnostic port to the vehicle network and programmed to, in response to an ignition switch being in an off position and a perimeter alarm being armed, inhibit transferring messages received from the diagnostic port to the vehicle network.

A gateway controller for a vehicle includes a microprocessor system configured to interface a diagnostic port to a vehicle network and programmed to, in response to an ignition switch being in an off position and a vehicle perimeter alarm being armed, inhibit transferring messages received from the diagnostic port to the vehicle network.

A method for protecting a vehicle network includes interfacing by a controller a diagnostic port to the vehicle network. The method also includes inhibiting by the controller message transfers from the diagnostic port to the vehicle network in response to a perimeter alarm system being armed. The method also includes triggering by the controller an alarm in response to receiving a message from the diagnostic port and the perimeter alarm system being armed.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
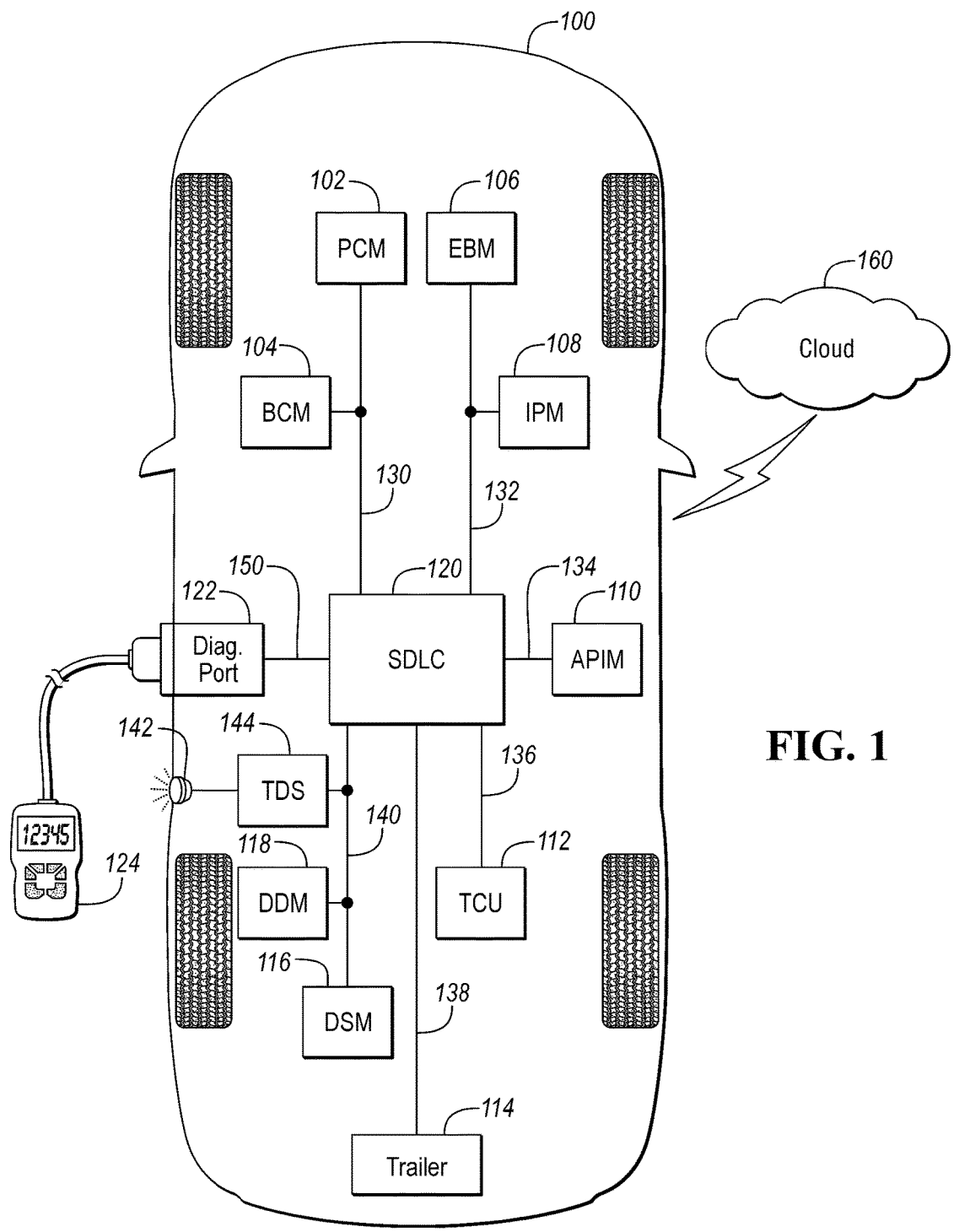
FIG. 1 is a diagram of a vehicle including a system for restricting external access to a vehicle network from a diagnostic port.

FIG. 1 depicts a possible configuration for a vehicle communication network within a vehicle 100. The vehicle 100 may include a plurality of electronic modules or ECUs. The electronic modules in the vehicle 100 may communicate via a vehicle communication network. The vehicle communication network may include a plurality of channels for communication. One or more channels of the vehicle network may be a serial bus such as a Controller Area Network (CAN). One or more channels may be a serial network protocol based on Local Interconnect Network (LIN) protocol. One or more channels may a serial network based on Media Oriented Systems Transport (MOST) protocol. One or more of the channels of the vehicle network may include an Ethernet network defined by Institute of Electrical and Electronics Engineers (IEEE) 802 family of standards.

Electronic modules may be electrically coupled to one or more of the channels of the vehicle network. Channels of the vehicle communication network may be dedicated for a particular purpose or vehicle function. For example, one channel (e.g, CAN) may be dedicated for vehicle control functions and provide a communication path for electronic modules that require the exchange of vehicle control signals. As another example, one channel (e.g., MOST) may be dedicated for entertainment functions for transporting audio and video signals between electronic modules. Each of the vehicle communication network channels may define a specific hardware interface and messaging protocol. Each of the electronic modules includes hardware and software components to implement the communication protocol to which a connection is made.

The vehicle 100 includes a diagnostic port 122. The diagnostic port 122 may include a connector that is mounted within the vehicle 100. For example, the diagnostic port 122 may be a connector that is located in a cabin of the vehicle near an instrument panel. The diagnostic port 122 may be electrically connected to one or more of the vehicle communication network channels. A user may access information on the vehicle communications network by connecting a tool, such as a scan device 124 to the diagnostic port 122. In prior art systems, channels of the vehicle communication network for which user access is desired are electrically connected to the diagnostic port 122.

The scan device 124 may include an interface to the channels of the vehicle communication network. In addition, the scan device 124 typically includes a microprocessor for implementing a diagnostic protocol as defined by the vehicle manufacturer. The diagnostic protocol may define diagnostic requests that may be issued to electronic modules on the vehicle communication network. In addition, the diagnostic protocol may define possible responses to the diagnostic requests. The diagnostic protocol may further define the format of the request and response messages as well as scaling and location of various signals contained therein. The diagnostic protocol may define a set of possible diagnostic services that are available for each of the electronic modules. The diagnostic protocol may define a method of addressing each of the electronic modules.

Communication on a selected channel may be initiated by the scan device 124. Messages intended for one or more of the electronic modules may be transmitted from the scan device 124 over the selected vehicle communication network channel. Electronic modules coupled to the selected channel may receive and decode the message and act/respond accordingly. A typical use for the scan device 124 is to read diagnostic trouble codes (DTCs) from the electronic modules. In addition, diagnostic protocols for vehicles may include monitoring information from the electronic modules.

The scan device 124 may be configured to send a change session diagnostic command to place one or more of the electronic modules in a diagnostic session. Diagnostic protocols may include one or more distinct diagnostic session modes. For example, a diagnostic protocol may include a program session, a default session, and an extended session. An electronic module receiving the change session diagnostic command may check various conditions to ensure the entry into the requested mode is possible. If entry into the requested mode is possible, the electronic module may enter the requested mode and send a response that the request was accepted. If entry into the requested mode is rejected, the electronic module may send a response that that the request was denied and an indication of the reason for denial.

The diagnostic sessions may provide different levels of functionality. When the program session is entered, the specified electronic module may be reprogrammed. That is, a new executable program may be transmitted and programmed into controller memory. The program session mode may be used to update functionality in the specified electronic module. The default session may permit some limited information retrieval from the electronic module. For example, in the default session mode, DTCs may be requested from the electronic module. The extended session may permit functions related to input/output (I/O) control for the electronic modules. For example, in the extended session mode, outputs of the electronic module may be set to different values independent of operational programming. In addition, the extended session mode may allow for configuration and parameter setting that may affect operation of the electronic module and impact vehicle performance.

Electronic modules in the vehicle 100 may be configurable via the scan device 124. Providing the proper diagnostic commands may alter parameters within the electronic module. Such commands are generally permitted in the extended session diagnostic mode. In addition, a module connected to the diagnostic port 122 may monitor standard bus channel traffic. The diagnostic session modes provide varying levels of functionality from merely monitoring and querying controllers to modifying performance and executable programs of a controller. As such, care must be taken when allowing the more intrusive modes to be entered.

In a typical vehicle, the diagnostic port 122 is electrically coupled to one or more channels of the vehicle communication network to permit convenient diagnostic access to all of the electronic modules. However, such a vehicle communication configuration may allow access for nefarious purposes. In some cases, a device coupled to the diagnostic port 122 could attempt to send bus traffic that resembles the normal bus channel traffic. In some cases, an unauthorized module connected to the diagnostic port 122 could flood the channel with messages or short the channels to prevent legitimate communication over the channel. A major concern related to vehicles is that a "hacker" may gain entry to the vehicle communication network and alter the operation of the vehicle using such methods. The diagnostic port 122 is a possible entry point to the vehicle communication network. As such, a method of preventing the diagnostic port 122 from interfering with the vehicle communication network is desirable.

A "hacker" having knowledge of vehicle diagnostic protocols could gain entry to the vehicle communication network and affect vehicle performance. In addition, once the vehicle network is accessed, information about the vehicle owner may be obtained. For example, an electronic module related to cellular communications may store names and phone numbers. In addition, a navigation module may store addresses, including the home address of the vehicle owner. In some cases, an electronic module could be reprogrammed in an undesirable manner. The result is that a "hacker" could compromise vehicle performance in unexpected ways without the vehicle owner knowing.

The vehicle 100 includes a plurality of systems that include one or more controllers for controlling their functionality. For example, the vehicle 100 includes a powertrain for propelling the vehicle 100. The powertrain may include an engine, one or more electric machines and a gearbox or transmission (not shown). The powertrain system may also include a powertrain control module (PCM) 102 that monitors and controls the powertrain. The powertrain system may also include a plurality of sensors (not shown) for monitoring various aspects of the powertrain operation. For example, the powertrain system may include an ignition switch sensor (not shown) that provides an ignition status signal to the PCM 102 that is indicative of the ignition state, such as: "off", "accessory", "run" or "start".

The vehicle 100 may include a body control module (BCM) 104 that monitors and controls a variety of vehicle systems including the power windows, power mirrors, air conditioning, immobilizer system, central locking, etc. The vehicle 100 may also include a plurality of sensors (not shown) for monitoring various aspects of the systems associated with the BCM 104 that provides signals (not shown) to the BCM 104. The BCM 104 may include a radio-frequency transceiver configured to communicate with a remote keyless entry (RKE) device (e.g., key fob). The BCM 104 may manage the RKE interface. The PCM 102 and BCM 104 may be coupled to a first communication channel 130 of the vehicle network. For example, the first communication channel 130 may be a high-speed vehicle bus (e.g., CAN) for transmitting/receiving data between modules. For example, the PCM may transmit data corresponding to the ignition signal and the BCM 104 may transmit door lock/unlock requests through the first communication channel 130.

The vehicle 100 may include an electronic braking module (EBM) 106 that monitors and controls operation of a braking system. For example, the EBM 106 may be electrically coupled to wheel speed sensors that are configured to provide a signal indicative of the rotational speed of the associated wheel. A vehicle speed signal may be computed from the wheel speed signals. The vehicle 100 may include an image processing module (IPM) 108 that monitors and controls an imaging device. For example, the imaging device may be a forward-looking camera configured for use in a collision warning or avoidance system. The EBM 106 and IPM 108 may be coupled to a second communication channel 132. For example, the second communication channel 132 may be a high-speed vehicle bus (e.g, CAN) for transmitting/receiving data between modules connected to the channel. For example, the EBM may transmit data corresponding to the vehicle speed through the second communication channel 132.

The vehicle 100 may include a driver seat module (DSM) 116 that monitors and controls placement of the seats. The vehicle 100 may include and a driver door module (DDM) 118 that monitors and controls features associated with doors of the vehicle (e.g., door locks, power windows, power mirrors). The vehicle 100 may include a perimeter alarm system or a theft deterrent system (TDS) 144 that monitors and controls an alarm system for detecting unauthorized vehicle access. The TDS 144 may activate an alert device 142 for signaling detection of potential theft. The alert device may include an audible alert such as a horn and/or speaker and a visible alert such as lamps. The TDS 144 may include a plurality of sensors (not shown) for detecting when to activate the alert device 142. For example, a vehicle motion sensor may detect motion of the vehicle and proximity sensors may detect motion of persons in a vicinity of the vehicle 100. The perimeter alert function may be enabled in response to locking the vehicle. Arming and disarming the perimeter alert function may correspond to locking and unlocking the vehicle 100 respectively. The DSM 116, TDS 144 and DDM 118 may be coupled to a third communication channel 140. For example, the third communication channel 140 may be a low or medium speed communication channel.

The vehicle 100 may include a trailer controller 114 that monitors and controls vehicle trailering equipment (not shown). The vehicle 100 may also include a plurality of sensors (not shown) for monitoring various aspects of the trailering equipment (not shown) that provide signals (not shown) to the trailer controller 114. The trailer module 114 may be coupled to a fourth communication channel 138.

The vehicle 100 may include an auxiliary protocol interface module (APIM) 110 that monitors and controls some external inputs to the vehicle network. For example, the APIM 110 may include a BLUETOOTH communications interface for communicating with BLUETOOTH enabled devices (e.g., mobile phone, tablet). The APIM 110 may also include a universal serial bus (USB) interface for communicating with USB enabled devices that are coupled to a USB interface. The APIM 110 may include a Secure Digital (SD) card interface for exchanging data with SD-cards that are inserted into the interface. The APIM 110 may be coupled to a fifth communication channel 134. For example, the APIM 110 may access media (e.g., movies and/or music) from devices coupled via BLUETOOTH or an inserted USB device. The APIM 110 may include a firewall that filters communication between the vehicle network and the external devices that are in communication with the APIM 110.

The vehicle may include a telematics control unit (TCU) 112 that monitors and controls communications with a cellular voice and/or data network. The TCU 112 may also include a Global Positioning System (GPS) interface for providing vehicle location information. The TCU 112 may be coupled to a sixth communication channel 136. The TCU 112 may be configured to communicate via one or more wireless networking (WiFi) standards such as IEEE 802.11. The TCU 112 may communicate with external systems via wireless communication through a cloud-based network 160. For example, the TCU 112 may access media (e.g., movies and/or music) from providers through the cloud-based network 160. The TCU 112 may include a firewall that filters communication between the vehicle network and the cellular data network that the TCU 112 is connected to.

Note that the modules and functions described are merely an exemplary configuration and other configurations are possible. Various functions and features that are prescribed to a given module may be performed by other modules. As the modules are communicatively coupled to one another, messages and signals may be modified to reflect the actual distribution of functions and features within the vehicle 100. Additional electronic modules and vehicle communication channels may be present.

The vehicle communications network may be configured as a "star" network in which a gateway module or controller 120 is configured as a central node to which all of the communication channels are connected. The gateway controller 120 may be referred to as a Smart Data Link Connector (SDLC). The SDLC 120 may include a communications interface for each channel of the vehicle communication network that it is coupled to. For example, the SDLC 120 may be electrically coupled to the first communication channel 130, the second communication channel 132, the third communication channel 140, the fourth communication channel 138, the fifth communication channel 134, and the sixth communication channel 136.

Figure 2:
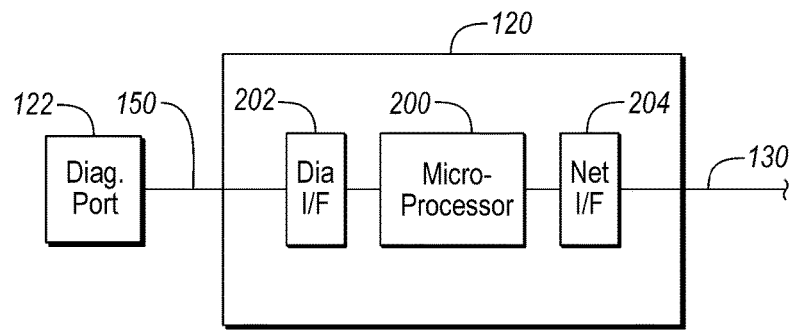
FIG. 2 is a block diagram of a possible configuration of a gateway controller.

FIG. 2 depicts a possible configuration of the SDLC 120. The SDLC 120 may include a microprocessor system 200 that includes volatile and non-volatile memory and is configured to execute program instructions. The SDLC 120 may be programmed to operate as a gateway between the channels of the vehicle network. That is, the SDLC 120 may be programmed to receive a message from a channel (e.g., first communication channel 130) and transmit the message on another channel (e.g., second communication channel 132). The SDLC 120 may be programmed to repackage signals received from the communication channels to form a message that is transmitted on another communication channel. Although FIG. 2 depicts a representative structure for a single diagnostic port 122 and a single vehicle network communication channel 130 it is contemplated that additional diagnostic ports and communication channels are supported in a similar manner.

The SDLC 120 may be electrically coupled to one or more diagnostic communication channels from the diagnostic port 122. For example, a diagnostic communication channel 150 may be defined as a high-speed interface (e.g., CAN). Additional diagnostic communication channels having different interfaces and/or protocols may be defined. A feature of this configuration is that the diagnostic communication channel 150 may not be permanently electrically coupled to the vehicle network communication channels 130, 132, 134, 136, 138, 140.

The microprocessor system 200 may include a plurality of input/output interfaces. The SDLC 120 may include a first communication interface circuit 202 for interfacing the diagnostic communication channel (e.g., 150) to the microprocessor system 200. The microprocessor system 200 may be programmed to receive messages from and transmit messages to the diagnostic communication channel (e.g., 150). The SDLC 120 may include a second communication interface circuit 204 for interfacing the vehicle network communication channel (e.g., 130) to the microprocessor system 200. The microprocessor system 200 may be programmed to receive messages from and transmit messages to the vehicle network communication channel (e.g., 130). Although not shown, each of the vehicle network communication channels may be implemented in the SDLC 120 in a similar manner.

The SDLC 120 may be programmed to transfer messages between channels of the vehicle network communication channels (e.g., 130, 132, 134, 136, 138, 140). The SDLC 120 may be programmed to relay and/or transfer messages between the diagnostic communication channel 150 and the vehicle network communication channels (e.g., 130, 132, 134, 136, 138, 140). In this configuration, the diagnostic communication channel 150 is electrically decoupled from the vehicle network communication channels (e.g., 130, 132, 134, 136, 138, 140). The SDLC 120 then controls which messages and data are transferred between the diagnostic communication channel 150 and the vehicle network communication channels (e.g., 130, 132, 134, 136, 138, 140). This differs from traditional vehicle configurations in the diagnostic communication channels are directly electrically coupled to the associated vehicle network communication channels.

The SDLC 120 may be programmed to monitor conditions for allowing a transfer of messages from the diagnostic communication channel 150 to one or more of the vehicle network communication channels. The SDLC 120 may monitor communications received from the diagnostic communication channel 150. The SDLC 120 may monitor communications received from the vehicle communication network channels (e.g., 130, 132, 134, 136, 138, 140) for predetermined signals and/or messages. For example, the SDLC 120 may monitor the vehicle communication network channels for a vehicle speed signal indicative of vehicle speed and an ignition switch status signal indicative of the ignition switch status.

The SDLC 120 may be programmed to receive messages via the diagnostic communication channel 150. The messages may be defined by the diagnostic protocol and includes, for example, a change session diagnostic command. In response to receiving a message over the diagnostic communication channel 150, the SDLC 120 may check various conditions to determine if the received message should be transferred to one or more of the vehicle network communication channels. For example, a vehicle speed signal and an ignition switch status signal may be checked. In response to the vehicle speed being less than a predetermined speed and the ignition switch position being in a run position, the message received from the diagnostic communication channel 150 may be transmitted to one or more of the vehicle network communication channels. When predetermined conditions are present, transfer of a message received from the diagnostic communication channel 150 to one or more of the vehicle communication network channels (e.g., 130, 132, 134, 136, 138, 140) may be inhibited. That is, the message is not transferred to any of the vehicle network communication channels.

For example, the SDLC 120 may monitor the diagnostic communication channel 150 for a change session diagnostic command (e.g., diagnostic service $10). The change session diagnostic command may request a change of diagnostic mode to the program session mode or the extended diagnostic session mode. In response to receiving the change session diagnostic command, the SDLC 120 may check the various conditions to determine if the change session diagnostic command should be relayed over the vehicle network communication channels. In response to the vehicle speed being less than a predetermined speed (e.g., 5 kilometers/hour) and the ignition switch position being in a run position, the change session diagnostic command may be transmitted to one or more of the vehicle network communication channels. In response to the vehicle speed being greater than or equal to the predetermined speed or the ignition switch being in a position other than the run position, the SDLC 120 may be programmed to inhibit the transfer of the diagnostic command to the vehicle network communication channels.

In some configurations, the SDLC 120 may further monitor the message received from the diagnostic communication channel 150 for an identifier or destination address of the intended recipient and transfer the message to the vehicle network communication channel to which the addressed module is connected to. In some configurations, the SDLC 120 may transfer the message received from the diagnostic communication channel 150 to all of the vehicle network communication channels.

Each module connected to the vehicle communication network may also monitor conditions to determine if a diagnostic request should be accepted. Although a diagnostic command may be transferred from the diagnostic communication channel 150 to the vehicle communication network channels, the response to the diagnostic command may further depend on conditions monitored by the individual electronic modules. For example, the individual modules may monitor other conditions before responding positively to the diagnostic commands. The conditions monitored by the SDLC 120 may be for transferring the commands between channels while the conditions monitored by the individual modules may be for determining if responding to the commands is appropriate.

If the conditions are such that the diagnostic command is not transferred to the vehicle network communication channels, the SDLC 120 may transmit a response message over the diagnostic communication channel 150 indicating that the request was rejected. When a diagnostic command is transferred to the vehicle communication network channels, the SDLC 120 may receive a response from the addressed electronic module that is related to the diagnostic command. Upon receiving the response, the SDLC 120 may transmit the message on the diagnostic communication channel 150.

The SDLC 120 may monitor signals indicative of the status of the perimeter alarm system. For example, the TDS 144 may transmit a status of the perimeter alarm system over the third vehicle network communication channel 140. The perimeter alarm system status signal may indicate states such as disarmed or armed. The perimeter alarm system may be in an armed state when the ignition is in an off position and the vehicle is locked. In response to the perimeter alarm system being armed, the SDLC 120 may inhibit the transfer of messages from the diagnostic communication channel 150 to the vehicle network communications channels. Further, in response to receiving a message from the diagnostic communication channel 150 while the perimeter alarm is armed, the SDLC 120 may request activation of the perimeter system alert device 142.

An exception to inhibiting the transfer of messages may be a diagnostic request to program new keys. The term keys may refer to any device used for gaining entry to the vehicle and enabling starting of the vehicle. For example, the term keys may include key fobs, electronically coded physical keys, and/or a wireless interface via a remote device (e.g., cell phone). For example, the BCM 104 may be configured to process and respond to diagnostic messages for reprogramming keys. The SDLC 120 may be programmed to transfer messages addressed to the BCM 104 that are received from the diagnostic communication channel 150 to the vehicle communication network channel associated with the BCM 104 (e.g., first communication channel 130). Such a message may be received by the SDLC 120 from the diagnostic communication channel 150 when the transfer inhibition conditions discussed previously are otherwise satisfied. In response to receiving a diagnostic request addressed to the BCM 104, the diagnostic request may be transferred to the associated vehicle network communication channel (e.g., 130) to permit learning and programming of new keys. The BCM 104 may include similar and/or additional conditions for entering the requested diagnostic modes and performing the requested operations. In this example, the module that handles key programming is the BCM 104. However, this feature applies to any module that is configured to handle key reprogramming.

Figure 3:
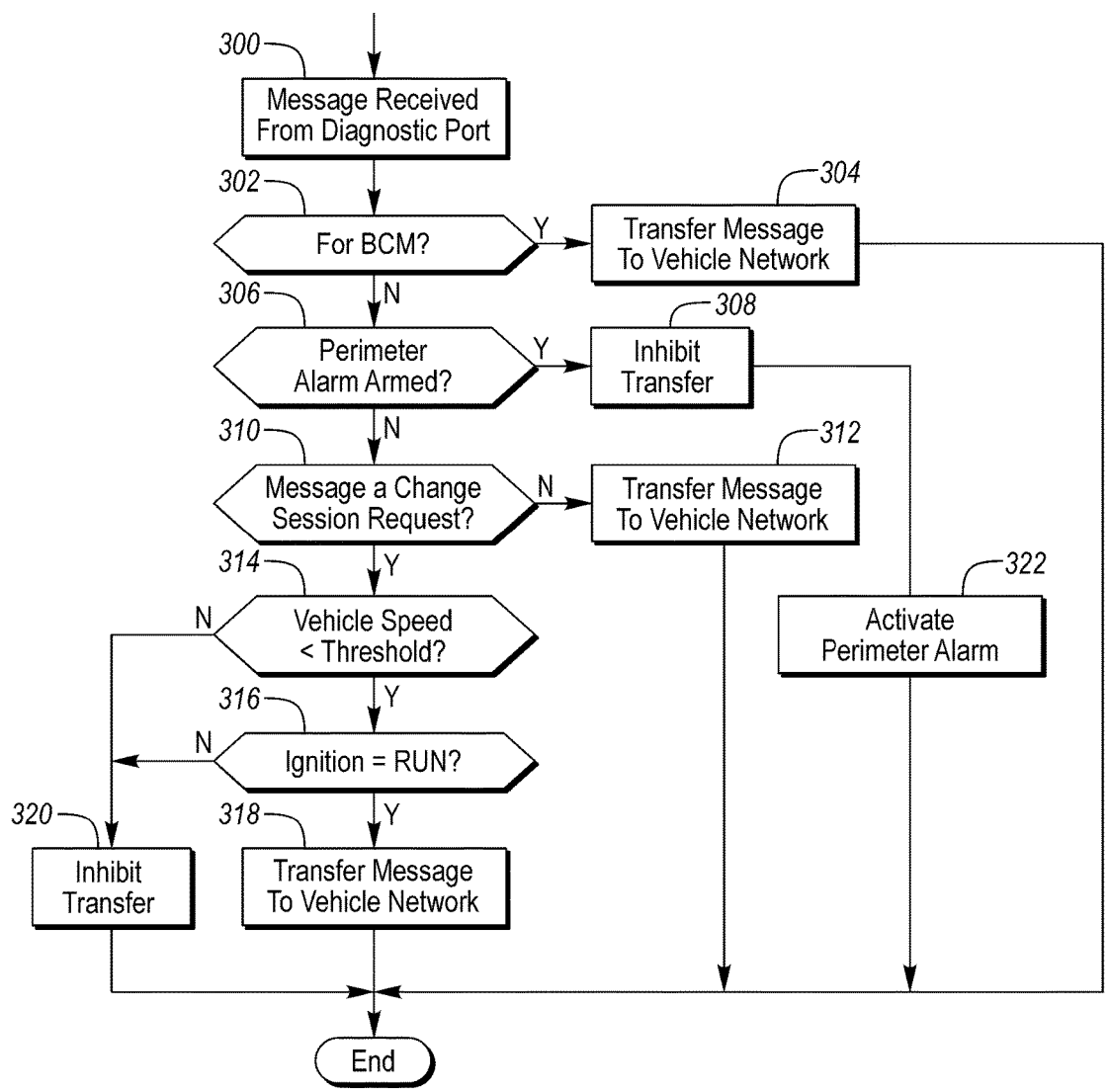
FIG. 3 is a flowchart for a sequence of operations to improve vehicle network security.

FIG. 3 depicts a flowchart for a sequence of possible operations that may be implemented or programmed into the SDLC 120. At operation 300, a message is received by the SDLC 120 from a device connected to the diagnostic port 122 via the diagnostic communication channel 150. At operation 302, an address or identifier that is included in the received message is checked to determine if the destination of the message is for the module that processes key programming requests (e.g., in this example, the BCM 104). If the destination is the module that processes key programming requests (e.g., BCM 104), then operation 304 is executed to transfer the message to the vehicle network communication channel associated with the module that processes key programming requests (e.g., BCM 104). If the destination of the message is not the module that processes key programming requests (e.g., BCM 104), then operation 306 is executed.

At operation 306, the SDLC 120 checks the perimeter alarm status. If the perimeter alarm status is indicative of the perimeter alarm being armed, operations 308 and 322 are executed. At operation 308, message transfer to the vehicle communication network is inhibited. At operation 322, the alerting device of the perimeter alarm is activated. If the perimeter alarm status is not in the armed state, then operation 310 is performed.

At operation 310, the SDLC 120 checks the message to determine if the message is a change diagnostic session request. If the message is not a change diagnostic session request, the operation 312 may be performed to transfer the message to the vehicle network. If the message is a change diagnostic session request, then operation 314 may be performed.

At operation 314, the SDLC 120 may compare a signal indicative of the vehicle speed to a threshold value. If the vehicle speed is greater than or equal to the threshold value, then operation 320 is executed to inhibit the transfer of the message. If the vehicle speed is less than the threshold value, then operation 316 is performed. At operation 316, the SDLC 120 may compare a signal indicative of the ignition switch position to a predetermined state. If the ignition switch is not in the run position, then operation 320 is executed to inhibit the transfer of the message. If the ignition switch is in the run position, then operation 318 may be executed to transfer the message to the vehicle network. The operations may be repeated when a message is received from the diagnostic communication channel 150.

The SDLC 120 acts as a first level of protection against unauthorized access via the diagnostic port 122. Since the SDLC 120 monitors high level conditions to allow transfer of messages between the diagnostic and vehicle network channels, many attempts at accessing the vehicle networks may be denied. The SDLC 120 may monitor high level conditions that may be indicative of unusual behavior. For example, the vehicle speed condition helps to prevent changes to outputs or operating parameters during vehicle motion which may be a sign of an attack on the vehicle. The condition regarding the ignition switch helps to prevent changes while the vehicle is in an OFF condition. For example, an intruder may enter an unlocked vehicle and connect to the diagnostic port 122. However, the intruder may not have a key and cannot place the vehicle into the run condition. By preventing message transfers in this condition, intruders cannot alter the vehicle behavior. In addition, activating the perimeter alarm when suspicious activity is detected may alert others of the presence of the intruder or hacker. The system described enhances vehicle network security from potential attacks via the diagnostic port.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a diagnostic port; and
   a gateway controller, electrically connected to the diagnostic port and a vehicle network, configured to interface the diagnostic port to the vehicle network and programmed to, in response to an ignition switch being in an off position and a perimeter alarm being armed, inhibit transferring messages received from the diagnostic port to the vehicle network.

2. The vehicle of claim 1 wherein the gateway controller is further programmed to, in response to the perimeter alarm not being armed and receiving a change session diagnostic request from the diagnostic port in a presence of a signal indicative of vehicle speed being greater than a predetermined threshold, inhibit transferring the change session diagnostic request to the vehicle network.

3. The vehicle of claim 1 wherein the gateway controller is further programmed to, in response to the perimeter alarm not being armed and receiving a change session diagnostic request from the diagnostic port in a presence of a signal indicative of an ignition switch not being in a run position, inhibit transferring the change session diagnostic request to the vehicle network.

4. The vehicle of claim 1 wherein the gateway controller is further programmed to, in response to inhibiting transfer of messages received from the diagnostic port to the vehicle network and receiving a message via the diagnostic port, trigger activation of the perimeter alarm.

5. The vehicle of claim 1 wherein the gateway controller is further programmed to, in response to receiving a diagnostic message with a destination address of a controller that programs keys from the diagnostic port in a presence of conditions for inhibiting transferring of messages, transfer the diagnostic message to the vehicle network.

6. The vehicle of claim 1 wherein the gateway controller is further programmed to output a response message via the diagnostic port in response to inhibiting transferring messages to the vehicle network.

7. A gateway controller for a vehicle comprising:
a microprocessor system configured to interface a diagnostic port to a vehicle network and programmed to, in response to an ignition switch being in an off position and a vehicle perimeter alarm being armed, inhibit transferring messages received from the diagnostic port to the vehicle network.

8. The gateway controller of claim 7 wherein the microprocessor system is further programmed to, in response to the vehicle perimeter alarm not being armed and receiving a change session diagnostic request from the diagnostic port in a presence of a signal indicative of vehicle speed being greater than a predetermined threshold, inhibit transferring the change session diagnostic request to the vehicle network.

9. The gateway controller of claim 7 wherein the microprocessor system is further programmed to, in response to the vehicle perimeter alarm not being armed and receiving a change session diagnostic request from the diagnostic port in a presence of a signal indicative of an ignition switch not being in a run position, inhibit transferring the change session diagnostic request to the vehicle network.

10. The gateway controller of claim 7 wherein the microprocessor system is further programmed to, in response to receiving a message from the diagnostic port in a presence of an alarm status signal indicative of a vehicle perimeter alarm being in an armed state, trigger the vehicle perimeter alarm system to activate an alarm.

11. The gateway controller of claim 7 wherein the microprocessor system is further programmed to, in response to receiving a diagnostic message with a destination address of a controller that programs keys from the diagnostic port in a presence of conditions for inhibiting transferring of messages, transfer the diagnostic message to the vehicle network.

12. The gateway controller of claim 7 wherein the microprocessor system is further programmed to, in response to the vehicle perimeter alarm not being armed and receiving a change session diagnostic request from the diagnostic port in a presence of a signal indicative of vehicle speed being less than or equal to a predetermined threshold and a signal indicative of an ignition switch being in a run position, transmit the change session diagnostic request on the vehicle network.

13. A method for protecting a vehicle network comprising:
interfacing by a controller a diagnostic port to the vehicle network;
inhibiting by the controller message transfers from the diagnostic port to the vehicle network in response to a perimeter alarm system being armed; and
triggering by the controller an alarm in response to receiving a message from the diagnostic port and the perimeter alarm system being armed.

14. The method of claim 13 further comprising inhibiting by the controller a transfer of a change session diagnostic command received from the diagnostic port to the vehicle network in response to a vehicle speed being greater than a predetermined speed or an ignition switch being in a position other than a run position.

15. The method of claim 14 further comprising transmitting by the controller a diagnostic response to the diagnostic port in response to inhibiting transfer.

16. The method of claim 14 further comprising transferring by the controller the change session diagnostic command received in response to a vehicle speed being less than or equal to the predetermined speed and an ignition switch position being in the run position.

17. The method of claim 16 further comprising transferring by the controller a response message to the change session diagnostic command received from the vehicle network to the diagnostic port.

18. The method of claim 13 further comprising transferring by the controller a diagnostic protocol message indicative of a request to program keys received from the diagnostic port to the vehicle network and inhibiting triggering of the alarm while the perimeter alarm system is armed.

* * * * *